# 2,781,107

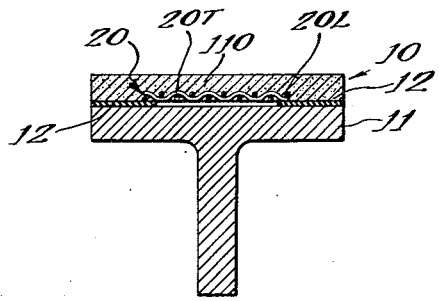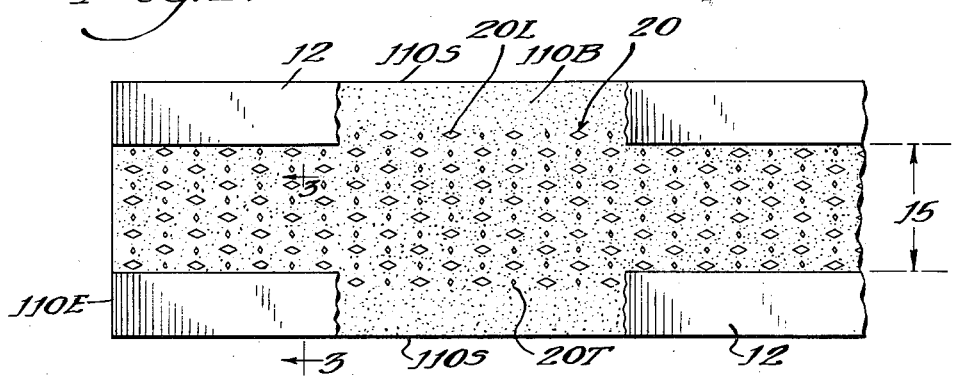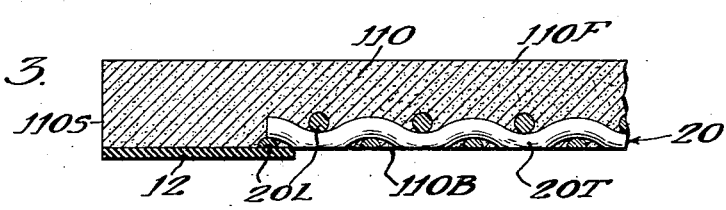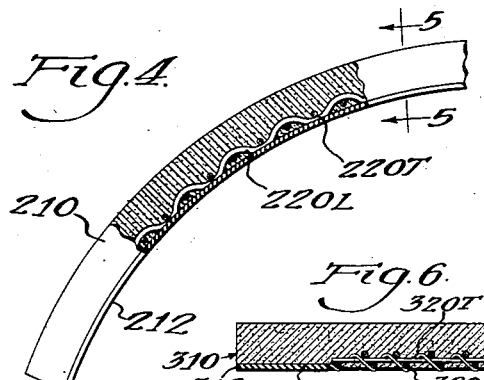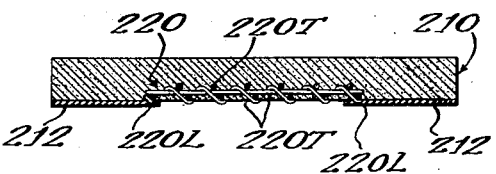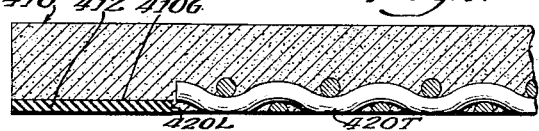
Inventors:
Francis H. Smith
Ray E. Spokes
By: Wallace and Cannon
Attorneys

FRICTION ELEMENT FOR BRAKE SHOES

Francis H. Smith, Detroit, and Ray E. Spokes, Ann Arbor, Mich., assignors to American Brake Shoe Company, New York, N. Y., a corporation of Delaware Application March 20, 1952, Serial No. 277,704

5 Claims. (Cl. 188—251)

This invention relates to composition friction elements and particularly to such friction elements that are adapted to be secured to automotive brake shoes and the like by adhesive bonding.

Composition friction elements adapted for use on brake shoes of automotive vehicles and the like have, in the past, been secured to the brake shoes in most instances by riveting, and it has been found that the useful life of such composition friction elements when thus used has been considerably extended by the incorporation in the elements of a backing material made from wire mesh or from a wire-reinforced open mesh fabric material. Such a fabric backed friction element is disclosed in the Spokes Patent No. 2,052,808, patented September 1, 1936, while a wire backed friction element is disclosed in the Blume et al. Patent No. 2,410,924, patented November 12, 1946.

Resort has been recently had to various adhesive bonding processes for securing the desired attachment of the friction elements to brake shoes, and this in view of the fact that friction elements thus secured to the brake shoes are said to result in added life because of an increase in the thickness of friction stock in contrast to those elements which heretofore have been riveted to the shoes. In connection with this adhesive bonding process for securing friction elements to brake shoes, it has been found that in order to reduce noise occasioned by braking, it is necessary to bond the friction elements to the brake shoes along longitudinal strips that extend only partially across the opposed surfaces of the friction element and the brake shoe, thus breaking the continuity of the bond and leaving the longitudinally extending central area of the friction element in a spaced and unsecured relationship with respect to the brake shoe. It has been found that this central area that is left in an unsecured relationship is not fully effective as a braking surface because it is spaced from the back and is free to bend toward the back, and hence the use of a mesh material as a backing in such friction elements is even more desirable than under the prior practice where rivets were utilized as the securing means. It has been found, however, that in many instances the presence of such backing material in the friction element has required the use of specially prepared adhesives for effecting the bond, and under such circumstances prior efforts to adhesively bond friction elements that incorporate such reinforcing backs have not been altogether successful or entirely satisfactory.

In view of the foregoing, it is an important object of the present invention to enable friction elements having such reinforcing backs to be effectually bonded to brake shoes by adhesive means, and an object related to the foregoing is to enable this to be accomplished in such a way that the reinforcing effect of the back is attained while at the same time avoiding any adverse effect of this back upon the bonding properties of the adhesive material. More specifically, it is an object of the present invention to enable the bonding material to effect a secure bond not only with the brake shoe, but also with portions of the reinforcing back, thereby to insure continued effectiveness of the bond in holding the friction element on the brake shoe, while at the same time serving to anchor the reinforcing back to the brake shoe so that the stresses that are effective in the friction element will be properly distributed and transmitted between the brake shoe and the friction element.

Other and further objects of the present invention will be apparent from the following description and claims and are illustrated in the accompanying drawings, which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a transverse sectional view showing a brake shoe having a composition friction element embodying the invention adhesively secured thereto;

Fig. 2 is a fragmentary and somewhat diagrammatic bottom plan view of the friction element shown in Fig. 1, the view being taken prior to the bonding of the element to the brake shoe;

Fig. 3 is an enlarged and fragmentary cross sectional view of the friction element, this view being an enlarged portion of the friction element as shown in Fig. 1;

Fig. 4 is a fragmentary side elevational view, taken partially in longitudinal section, and showing a friction element embodying a different type of reinforcing back;

Fig. 5 is a cross sectional view taken substantially along the line 5—5 of Fig. 4;

Fig. 6 is a view similar to Fig. 5 and showing an alternative construction; and

Fig. 7 is a view similar to Fig. 3 and showing the alternative construction of Fig. 6 with the reinforcing material of Fig. 3.

For purposes of disclosure the invention is herein illustrated in Figs. 1 to 3 of the drawings as embodied in a composition friction element 10 that, as shown in Fig. 1, is illustrated in assembled relation on an automotive brake shoe 11 to which it is secured adhesively by bonding strips 12 disposed between and bonded to the friction element 10 and the brake shoe 11. The friction element 10 comprises an elongated body 110 formed from friction material bonded with a suitable binder such as a resinous material in accordance with known practice, and when this body is intended for use in association with an automotive brake shoe, the body is of rectangular form and is molded to an arcuate shape substantially complemental to the shoe on which it is to be used. In this form the body 110 has an outer wearing or front face 110F, an inner attachment or back face 110B, end edges 110E and side edges 110S, and the adhesive bonding strips 12 are disposed on the back face 110B of the body 110, as will be evident in Figs. 1 to 3 of the drawings, so that when the friction element 10 is sold, it has the adhesive strip 12 in the proper relation thereon and is ready for bonding to a brake shoe, as by heat and pressure. This adhesive may be of the kind disclosed in Saunders et al. Patent No. 2,376,854, patented May 22, 1945.

As hereinbefore pointed out, it has been determined that avoidance of brake noise in automotive brakes using adhesively secured friction elements may be reduced by the use of what has been termed "edge bonding," or in other words, by applying the adhesive bonding material in strips 12 that extend from the edges 110S for a substantial distance toward each other but which terminate in spaced relation so as to leave a longitudinally extending central strip 15, Fig. 2, in an unbonded relationship to the shoe. The use of such an edge bonded mounting serves, of course, to expose the composition friction material to lateral cracking or surface scuffing between the two edge bonding strips when an unusual pressure or impact is exerted on the central or unbonded portion of the composition friction material, and to avoid the possibility of such deleterious effect on the friction element under such circumstances, the friction element 10 of the present invention has a reinforcing back 20 embedded in the rear face 110B and extending longitudinally from end to end of the friction element.

The reinforcing back 20 is afforded by woven material which, in the form of the invention illustrated in Figs. 1 to 3, is afforded by woven wire mesh material of the character disclosed in the aforesaid Blume et al. patent. This woven material affords longitudinal strands 20L and interwoven transverse strands 20T, and under and in accordance with the present invention, the reinforcing back 20 is formed in such a width that the two outermost longitudinal strands 20L are disposed under the adjacent edges of the adhesive strips 12 as shown in Figs. 1 to 3. Thus the reinforcing back 20 is slightly wider than the central strip 15, and the outermost longitudinal strands 20L thereof are therefore securely bonded to the adhesive strips 20 so as to be effectually anchored to the brake shoe 11 by the adhesive strips.

This effective anchoring of the reinforcing back 20 enables the back 20 to accomplish its reinforcing function in the desired manner, and yet, the major portions of the adhesive bonding strips 12 are bonded to the smooth surfaces of the border areas of the friction element so as to promote efficient bonding of the strips 12 to the friction element.

In Figs. 4 and 5 of the drawings there is illustrated an alternative form of the invention in which a molded friction element 210 has a reinforcing back 220 made from a wire-reinforced, open mesh, woven fabric material such as the asbestos material as disclosed in the aforesaid Spokes patent and embedded in the rear face of the friction element 210 so as to be related to adhesive bonding strips 212 in the same manner as hereinbefore described in connection with Figs. 1 to 3. Thus the woven fabric back 220 embodies longitudinal strands 220L and interwoven transverse strands 220T, and the width of the back 220 is such that the outermost longitudinal strands 220L are disposed just under the adjacent edges of the bonding strips 212, and hence the reinforcing back 220 is related to the bonding strips in the same manner as hereinbefore described with respect to the friction element 10. It may be noted, however, that a backing as 220 affords the increased strength required in some instances for the curving or shaping of the friction element.

In Figs. 6 and 7 of the drawings, additional alternative embodiments are shown which differ from each other only in the use of the wire backing material of the aforesaid Blume patent in Fig. 7, and the use of the wire-reinforced, open mesh woven fabric backing material as for instance the asbestos material of the aforesaid Spokes patent in Fig. 6. Thus in the embodiment of Fig. 6, a molded friction element 310 has a reinforcing back 320 made from such wire-reinforced woven fabric material embedded in the rear face thereof so that the side edges of the back 320 are spaced from the edges of the element 310 in an amount equal to the width of the adhesive bonding strips that are to be used. The woven fabric back 320 embodies longitudinal strands 320L and interwoven transverse strands 320T, and the rear face of the element 320 is ground to afford shallow rabbeted grooves 310G which are of the same width as the desired adhesive bonding bands that are to be used. The rabbeted grooves 310G are of a depth equal to the thickness that is to be assumed by the adhesive bands after heat curing. Thus in the formation of the grooves 310G, the edge portions of the outermost longitudinal strands 320L, and the ends of the transverse strands 320T will be exposed in the side edges of the grooves 310G. The adhesive bonding material is then applied in bonding strip 312 disposed within the groove 310G and this bonding material engages the bottom and side surfaces of the grooves. The thickness of the adhesive strips 312 is just slightly greater than the depth of the grooves 310G so that when the element 310 is bonded to a shoe by heat curing, the back of the element 310 between the bands 312 will be in bearing contact with the shoe. The friction element will thus be anchored to the shoe, and by contact with adhesive strips 312, the edge portions of the reinforcing back are anchored directly to the adhesive bands 312.

In the embodiment of the Fig. 7, a molded friction element 410 has an embedded wire back material 420 of the material disclosed in Fig. 3, and this material is so located that by grinding of the back face of the element, grooves 410G are formed in the same manner as described in connection with Fig. 6. This exposes the ends of transverse members 420T, as well as the outermost longitudinal members 420L of the backing material, and the adhesive is located in the grooves 410G in the relationship, and with the advantageous results described hereinbefore in relation to Fig. 6.

From the foregoing description it will be apparent that the present invention enables the results obtainable by adhesive bonding of friction elements to be materially improved, and enables reinforcing backs such as the types disclosed to be effectually utilized in friction elements that are to be mounted by adhesive bonding methods.

Hence, while we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A friction element adapted for adhesive bonding to a brake shoe and comprising an elongated body of composition friction material having front and back faces and side and end edges, a woven reinforcing back having interwoven transverse and longitudinal strands embedded in a partially exposed relation in said back face of said body with the outermost longitudinal strands thereof spaced substantially from the respective side edges of said body to define unreinforced border strips along the respective edges of said back face, and strips of adhesive bonding material extended along and bonded to said border strips of said back face and overlapping and bonded to the exposed portions of the respective outermost strands of said reinforcing back.

2. In a friction element adapted for adhesive edge-bonding to a brake shoe, an elongated body of composition friction material having front and back faces and side and end edges, an adhesive bonding material applied to said back face in two longitudinal strips of adhesive bonding material extending from one end edge to the other end edge and with said strips extended from the respective side edges of said back face for a substantial distance so as to leave a longitudinally extending and centrally disposed area devoid of said adhesive, and a woven reinforcing backing embodying interwoven longitudinal and transverse strands and partially embedded in said back face so as to span said centrally disposed area and dispose the outermost longitudinal strands only of said reinforcing back beneath and in a bonded relation to the respective strips of adhesive bonding material, said outermost strands being spaced substantially inwardly from the respective outer edges of said back face to define unreenforced border strips along the respective outer edge portions of said back face.

3. In a friction element adapted for adhesive edge-bonding to a brake shoe, an elongated body of composition friction material having front and back faces and side and end edges, an adhesive bonding material applied as a coating to said back face in two longitudinal strips of adhesive bonding material extending from one end edge to the other end edge and with said strips extended from the respective side edges of said back face for a substantial distance so as to leave a longitudinally extending and centrally disposed uncoated area, and a woven wire reinforcing backing embodying interwoven longitudinal and transverse wire strands and partially embedded in said back face so as to span said centrally disposed uncoated area and dispose the outermost longitudinal strands of said reinforcing back beneath and in a bonded relation to the respective strips of adhesive bonding material, said outermost strands being spaced substantially inwardly from the respective outer edges of said back face to define unreenforced border strips along the respective outer edge portions of said back face.

4. In a friction element adapted for adhesive edge-bonding to a brake shoe, an elongated body of composition friction material having front and back faces and side and end edges, an adhesive bonding material applied as a coating to said back face in two longitudinal strips of adhesive bonding material extending from one end edge to the other end edge and with said strips extended from the respective side edges of said back face for a substantial distance so as to leave a longitudinally extending and centrally disposed uncoated area, and a woven wire-reinforced woven cloth reinforcing backing embodying interwoven longitudinal and transverse strands and partially embedded in said back face so as to span said centrally disposed uncoated area and dispose the outermost longitudinal strands of said reinforcing back beneath and in a bonded relation to the respective strips of adhesive bonding material, said outermost strands being spaced substantially inwardly from the respective outer edges of said back face to define unreenforced border strips along the respective outer edge portions of said back face.

5. A friction element adapted for adhesive bonding to a brake shoe and comprising an elongated body of composition friction material having front and back faces and side and end edges and having relatively shallow rabbeted grooves formed in the back face thereof, a woven reinforcing back having interwoven transverse and longitudinal strands embedded in a partially exposed relation in said back face of said body with the outermost longitudinal strands thereof exposed in the sides of said grooves to define unreinforced border strips in said grooved portions along the respective edges of said back face, and strips of adhesive bonding material extended along said border strips in said grooves of said back face and bonded to the exposed portions of the respective outermost strands of said reinforcing back.

References Cited in the file of this patent

UNITED STATES PATENTS

| | | |
|---|---|---|
| 1,532,141 | Kenyon | Apr. 7, 1925 |
| 1,539,444 | Trainer | May 26, 1925 |
| 1,687,151 | Thompson | Oct. 9, 1928 |
| 1,756,936 | Bendix | May 6, 1930 |
| 1,947,894 | Whitworth | Feb. 20, 1934 |
| 2,052,808 | Spokes | Sept. 1, 1936 |
| 2,531,782 | Moore | Nov. 28, 1950 |
| 2,628,693 | Rodger | Feb. 17, 1953 |

FOREIGN PATENTS

| | | |
|---|---|---|
| 461,292 | Canada | Nov. 22, 1949 |

OTHER REFERENCES

"Brake Service," page 25; May 1949.